(12) United States Patent
Schmidt et al.

(10) Patent No.: US 11,540,904 B2
(45) Date of Patent: Jan. 3, 2023

(54) PRODUCTION METHOD FOR A DENTAL AID MADE OF A THERMOPLASTIC FILM OR PLATE

(71) Applicant: SIRONA DENTAL SYSTEMS GMBH, Bensheim (DE)

(72) Inventors: Christian Schmidt, Bensheim (DE); Peter Fornoff, Reichelsheim (DE)

(73) Assignee: DENTSPLY SIRONA INC., York, PA (US)

( * ) Notice: Subject to any disclaimer, the term of this patent is extended or adjusted under 35 U.S.C. 154(b) by 400 days.

(21) Appl. No.: 16/616,730

(22) PCT Filed: Jun. 4, 2018

(86) PCT No.: PCT/EP2018/064586
§ 371 (c)(1),
(2) Date: Nov. 25, 2019

(87) PCT Pub. No.: WO2018/220221
PCT Pub. Date: Dec. 6, 2018

(65) Prior Publication Data
US 2021/0169609 A1  Jun. 10, 2021

(30) Foreign Application Priority Data

Jun. 2, 2017  (DE) .......................... 102017209403.6

(51) Int. Cl.
| | | |
|---|---|---|
| *A61C 7/00* | (2006.01) |
| *A61C 7/08* | (2006.01) |
| *A61C 13/34* | (2006.01) |
| *B29C 51/08* | (2006.01) |
| *B29C 51/26* | (2006.01) |
| *B29C 51/46* | (2006.01) |

(52) U.S. Cl.
CPC ............... *A61C 7/002* (2013.01); *A61C 7/08* (2013.01); *A61C 13/34* (2013.01); *B29C 51/08* (2013.01); *B29C 51/266* (2013.01); *B29C 51/46* (2013.01)

(58) Field of Classification Search
CPC ....... B29C 51/08; B29C 51/266; B29C 51/46; A61C 13/34; A61C 7/002; A61C 7/08
See application file for complete search history.

(56) References Cited

U.S. PATENT DOCUMENTS 5,022,855 A * 6/1991 Jeckel .................... A61C 7/282
433/18
2012/0024299 A1   2/2012 Scheu

FOREIGN PATENT DOCUMENTS

| | | |
|---|---|---|
| DE | 102007044544 A1 | 3/2009 |
| DE | 102008061325 A1 | 4/2010 |
| DE | 102011113694 A1 | 3/2013 |

(Continued)

OTHER PUBLICATIONS

International Search Report; PCT/EP2018/064586; Sep. 21, 2018 (completed); dated Oct. 8, 2018.

(Continued)

*Primary Examiner* — Monica A Huson
(74) *Attorney, Agent, or Firm* — Dentsply Sirona Inc.

(57) ABSTRACT

The invention relates to a method for producing a dental aid from a thermoplastic film or plate, wherein a digital three-dimensional working model is created in a computer-aided manner using a three-dimensional data set of at least one part of an upper jaw and/or lower jaw.

8 Claims, 3 Drawing Sheets

(56) References Cited

FOREIGN PATENT DOCUMENTS

| | | |
|---|---|---|
| EP | 2957252 A1 | 12/2015 |
| KR | 20070114107 A | 11/2007 |
| WO | 2010043419 A1 | 4/2010 |
| WO | 2014082624 A2 | 6/2014 |

OTHER PUBLICATIONS

Written Opinion of the International Searching Authority; PCT/EP2018/064586; Sep. 21, 2018 (completed); dated Oct. 8, 2018.
International Preliminary Report on Patentability; PCT/EP2018/064586; Sep. 21, 2018 (completed); dated Oct. 8, 2018.

* cited by examiner

PRODUCTION METHOD FOR A DENTAL AID MADE OF A THERMOPLASTIC FILM OR PLATE

TECHNICAL FIELD

A method for producing a dental aid from a thermoplastic film or plate, wherein the plastic film or plate is deep drawn on a physical working model inside a deep-drawing device and the dental aid is created from the deep drawn plastic film or plate by separation along a cutting line.

BACKGROUND OF THE INVENTION

A method for producing a dental aid in a deep-drawing device is known from WO 2014/082624 A2, wherein a working model of an upper jaw and/or lower jaw is placed into the deep-drawing device and a deep-drawing film is placed onto the working model and deep drawn into a splint. The working model is created in a computer-aided manner on the basis of biometric data of the upper and/or lower jaw.

WO 2010/043419 A1 describes a production method for a multilayer dental splint.

Suitable thermoplastic materials or deep-drawing films or plates for dental aids are known from DE 10 2011 113 694 A1 or EP 2 417 927 A1, for example.

A particularly time-consuming step in the production of a dental aid to be created by means of deep drawing is the separation, e.g. cutting out, of the dental aid from the deep drawn plastic film or plate. Furthermore, special skill and experience is needed to carry out this step without error and with a satisfactory result.

The object of the present invention is to further develop the known methods and in particular to provide a more reliable and faster production method.

SUMMARY OF THE INVENTION

One subject matter of the invention is a method for producing a dental aid from a thermoplastic film or plate, wherein a digital three-dimensional working model is created in a computer-aided manner using a three-dimensional data set of at least one part of an upper jaw and/or lower jaw, a physical working model is produced on the basis of the digital working model, the plastic film or plate is deep drawn on the physical working model inside a deep-drawing device and the dental aid is created from the deep drawn plastic film or plate by separation along a cutting line, prior to producing the physical working model, the digital working model is supplemented with an auxiliary structure automatically and/or via manual input means, wherein the auxiliary structure is configured as an elevation or a depression, extends along a digital cutting line model in the working model, and the digital cutting line model is created in the digital working model automatically and/or via manual input means.

Here, the term "dental aids" refers to removable plastic parts or splints, which are at least partially adapted to the shape of the upper jaw and/or the lower jaw, for example bruxism splints, correction splints, such as retainers or aligners, mouthguards, bleaching splints or snoring splints and splint-based temporary bridges.

The dental aid, e.g. a dental splint, is produced from thermoplastic materials by means of a forming process known as deep drawing. Deep drawing, also referred to as thermoforming, hot forming or vacuum deep drawing, is a process for forming thermoplastic materials. Thermoforming processes are typically distinguished by the respective semi-finished product used, whereby thinner semi-finished products are referred to as films and thicker semi-finished products from about 1.5 mm are referred to as plates. Circular blanks having a thickness of 0.5 mm to 5 mm are typically used in dental technology, whereby, at least in sections and as a result of material stretching, the material thickness of the resulting product of a deep-drawing process is smaller.

A dental model, the so-called working model, which is produced according to the invention on the basis of a digital working model, e.g. using computer-aided manufacturing (CAM), serves as a form template for the forming process.

The digital working model is created on the basis of a three-dimensional data set, which reflects the shape of the upper jaw and/or the lower jaw or at least one part of the upper jaw and/or lower jaw, and supplemented according to the invention with an auxiliary structure.

The three-dimensional data set of the upper jaw/lower jaw is obtained by taking an impression in the mouth of a patient and then measuring the impression or a positive model of the impression, for example, or by direct intraoral optical measurement of the upper jaw and/or lower jaw, e.g. using an intraoral camera.

The creation of the digital working model on the basis of the three-dimensional data set takes place automatically and/or via manual input means.

The separation of the dental aid from the deep drawn plastic film or plate is done manually using a tool. The auxiliary structure permits controlled separation along the auxiliary structure and can be carried out reliably in a particularly simple and fast manner, even by inexperienced users. Redos, which are often made necessary by processing mistakes when separating manually without the auxiliary structure according to the invention, are consequently avoided.

If the auxiliary structure is configured as an elevation, separation takes place by guiding a machining tool to the auxiliary structure and then along the auxiliary structure. The dental aid thus receives an outward-facing, sharp cut edge, as a result of which risk of injury to the gums when inserting the produced dental aid can reliably be avoided.

When using an auxiliary structure configured as a depression, a guide channel for the tool is provided. A width of the depression is advantageously matched in cross section to a diameter of the tool to be used for the separation. The tool particularly advantageously has a diameter that decreases toward the outside, and the width of the depression is particularly advantageously smaller than the largest diameter of the tool.

The auxiliary structure is advantageously arranged on the cutting line model or adjacent to the cutting line model or at a first distance to the cutting line model. Depending on the width and design of the auxiliary structure and depending on the type of tool used for the separation, the position of the actually obtained cut edge shifts in relation to the auxiliary structure. It is therefore advantageous to take this into account when positioning the auxiliary structure.

The gingival line is advantageously determined automatically and/or manually in the digital working model and used according to a first alternative embodiment as a cutting line model. According to a second alternative embodiment, an auxiliary line is created at a fixed distance in the direction of the gingiva and parallel to the gingival line, and used as a cutting line model. According to a third alternative embodiment, an arcuate auxiliary line is created adjacent to the gingival line or at a distance to the gingival line and used as a cutting line model.

For many applications and/or dental auxiliary structures, a profile of the cutting line as close as possible to the gingival line is desirable. With a cutting line that extends exactly along the gingival line, pressure points, for example, in the area of the gingiva when the dental aid is worn, are avoided. Particularly simple separation and, if applicable, further processing is possible with a straight cutting line according to the third alternative embodiment.

The auxiliary structure advantageously has a round, n-gonal or tapered cross section.

The dental aid is advantageously separated from the deep drawn plastic film or plate by means of a machining tool, whereby the tool at least to some extent ablates the auxiliary structure or at least to some extent reaches into the auxiliary structure during separation.

The invention further relates to a system for producing a dental aid from a thermoplastic film or plate, comprising a deep-drawing device and a computer unit, whereby the system is designed to carry out the production method of the type described above.

The system advantageously comprises a software program, whereby the software program can be executed on the computer unit, the software program comprises at least one digital tool, the digital tool can be operated via at least one input means and the digital tool makes the supplementation of the auxiliary structure in the digital working model possible.

BRIEF DESCRIPTION OF THE DRAWINGS

Design examples of the invention are illustrated in the drawing. The figures show.

DETAILED DESCRIPTION OF THE INVENTION

Figure 1:
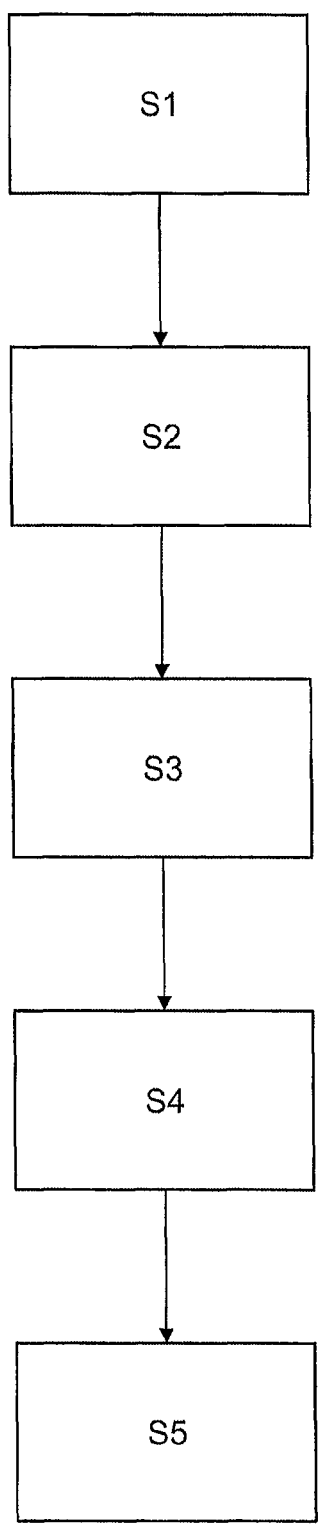
FIG. 1 a schematic illustration of the method according to the invention.

FIG. 1 shows a schematic illustration of the method according to the invention according to a first embodiment comprising Method Steps S1 to S5.

In the first Method Step S1, the jaw region to be provided with a dental aid, in this case a dental splint, is recorded digitally. For this purpose, a three-dimensional data set of a lower jaw or an upper jaw or at least a part of the lower jaw or the upper jaw is produced by means of a measuring device, e.g. an intraoral camera, and stored on a suitable storage medium of a computer unit.

In the second Method Step S2, a digital working model is created in a computer-aided manner from the data set produced in Method Step S1. The digital working model essentially corresponds to the three-dimensional data set and additionally comprises an auxiliary structure configured as an elevation or a depression, whereby the auxiliary structure is designed and positioned in Method Step S2 by means of the computer unit.

In a third Method Step S3, a physical working model is produced based on the digital working model created in the second Method Step S2, e.g. by means of a milling and/or grinding device or using a 3D printer.

In a fourth Method Step S4, a thermoplastic film or plate is deep drawn on the physical working model by means of a deep-drawing device.

In a fifth method step, the deep drawn plastic film or plate is separated along the auxiliary structure by means of a tool.

If the auxiliary structure is an elevation, at least one peak or crest of the elevation and the part of plastic film or plate drawn over it are removed by means of a milling or grinding tool. If the auxiliary structure is a depression, a milling or grinding tool is guided at least partially into the depression to separate the plastic film or plate along the auxiliary structure.

Figure 2:
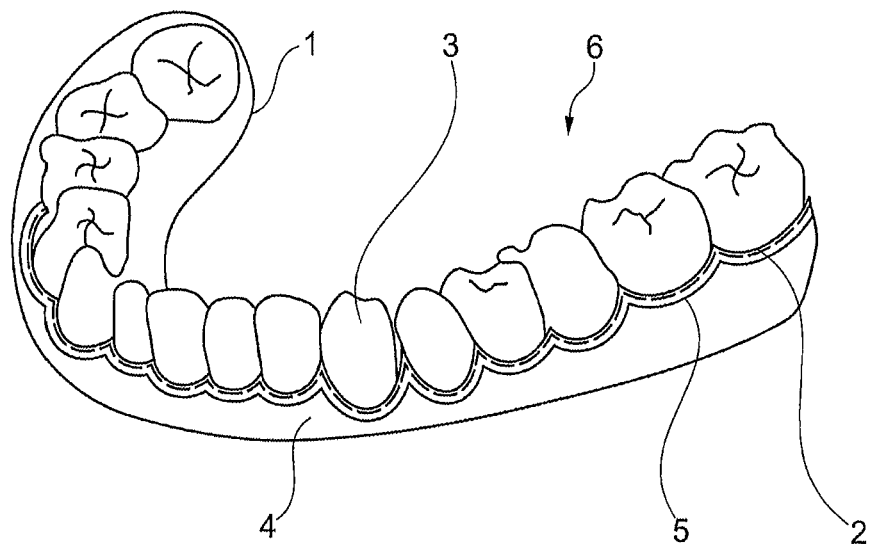
FIG. 2 a schematic view of a digital working model.

FIG. 2 shows a schematic view of a three-dimensional data set 1 of a lower jaw. According to a second embodiment, a boundary line between the teeth 3 and the gums 4 is automatically identified as a draft version of a cutting line 2, and an auxiliary structure 5 is automatically positioned at a fixed distance A to the draft version of the cutting line 2. Together with the auxiliary structure 5, the three-dimensional data set 1 forms a digital working model 6.

Figure 3A:
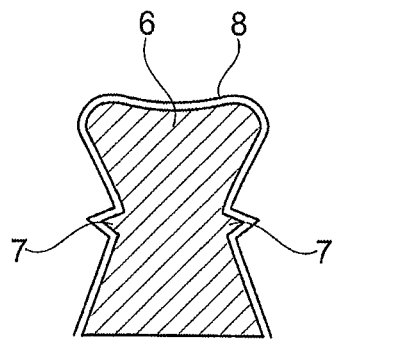
FIG. 3A,B schematic sectional views of the working model according to a variety of embodiments, FIG. 4A-C schematic views of the auxiliary structure according to a variety of embodiments.
Figure 3A:
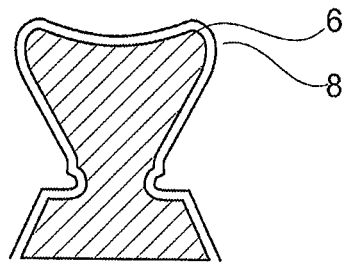
Figure 3A:
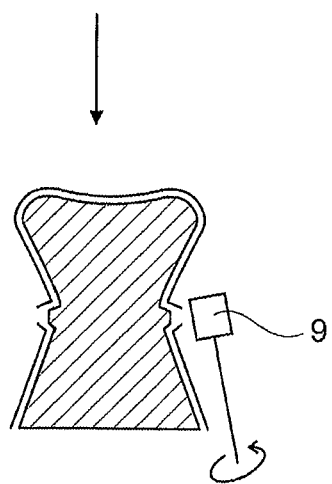

As shown schematically in FIG. 3A, the auxiliary structure 5 according to a first alternative embodiment is configured as an elevation 7 on the working model 6. After the deep-drawing process, the elevation 7 and the plastic film or plate 8 drawn over it are removed at least partially by means of a tool 9, for example by grinding or milling.

Figure 3B:
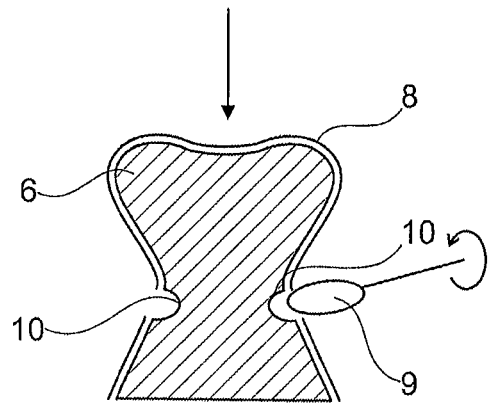

As shown schematically in FIG. 3B, the auxiliary structure 5 according to a second alternative embodiment is configured as a depression 10 projecting into the working model 6. After the deep-drawing process, the plastic film or plate 8 is separated along the depression 10 using a tool 9 while guiding the tool 9 at least partially into the depression 10.

Figure 4A:
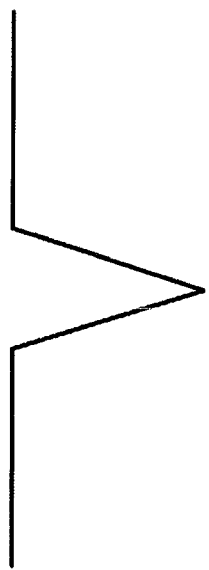
Figure 4B:
Figure 4C:
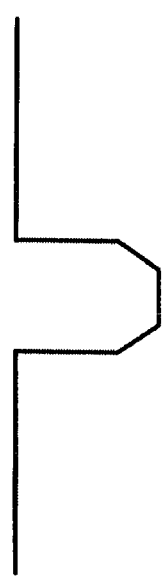

Different embodiments of a cross section of the auxiliary structure are outlined in FIG. 4A-C, namely tapered, rounded or n-gonal.

LIST OF REFERENCE SIGNS

1 Three-dimensional data set
2 Cutting line
3 Teeth
4 Gums
5 Auxiliary structure
6 Digital working model
7 Elevation
8 Deep drawn plastic film or plate
9 Tool
10 Depression

The invention claimed is:

1. Method for producing a dental aid from a thermoplastic film or plate, the method comprising the steps of:
   creating a digital three-dimensional working model in a computer-aided manner using a three-dimensional data set of at least one part of an upper jaw and/or lower jaw;
   producing a physical working model based on the digital working model;
   wherein the plastic film or plate is deep drawn on the physical working model inside a deep-drawing device; and
   wherein the dental aid is created from the deep drawn plastic film or plate by separation along a cutting line, wherein prior to producing the physical working model, the digital working model is supplemented with an auxiliary structure automatically and/or via manual input means, wherein wherein the auxiliary structure is configured as an elevation or a depression and extends along a digital cutting line model in the working model; and wherein the digital cutting line model is created in the digital working model automatically and/or via manual input means;

wherein the gingival line is determined automatically and/or manually in the digital working model, an auxiliary line is created at a fixed distance in the direction of the gingiva and parallel to the gingival line and used as a cutting line model.

2. The method according to claim 1, wherein the auxiliary structure is arranged on the cutting line model or adjacent to the cutting line model or at a first distance to the cutting line model.

3. The method according to claim 1, wherein the gingival line is determined automatically and/or manually in the digital working model and used as a cutting line model.

4. The method according to claim 1, wherein the gingival line is determined automatically and/or manually in the digital working model, an arcuate auxiliary line is created adjacent to the gingival line or at a distance to the gingival line and used as a cutting line model.

5. The method according to claim 1, wherein the auxiliary structure has a round, n-gonal or tapered cross section.

6. The method according to claim 1, wherein the dental aid is separated from the deep drawn plastic film or plate by means of a machining tool, wherein the tool at least to some extent ablates the auxiliary structure or at least to some extent reaches into the auxiliary structure during separation.

7. System for producing a dental aid from a thermoplastic film or plate, comprising a deep-drawing device and a computer unit, wherein the system is designed to carry out the method according to claim 1.

8. System according to claim 7, wherein the system further comprises a software program, wherein the software program is executed on the computer unit, the software program includes at least one digital tool, the digital tool is operated via at least one input means, and the digital tool is designed to supplement the auxiliary structure in the digital working model.

\* \* \* \* \*